United States Patent
Okamoto et al.

(10) Patent No.: US 8,347,706 B2
(45) Date of Patent: Jan. 8, 2013

(54) FLOW-RATE MEASUREMENT APPARATUS

(75) Inventors: Yuki Okamoto, Hitachinaka (JP); Takeshi Morino, Hitachinaka (JP); Naoki Saito, Tokai (JP); Masayuki Hio, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 344 days.

(21) Appl. No.: 12/850,338

(22) Filed: Aug. 4, 2010

(65) Prior Publication Data

US 2011/0072895 A1    Mar. 31, 2011

(30) Foreign Application Priority Data

Sep. 30, 2009    (JP) ................. 2009-225940

(51) Int. Cl.
*G01F 1/68* (2006.01)
(52) U.S. Cl. ................. 73/202.5; 73/204.21
(58) Field of Classification Search .......... None
See application file for complete search history.

(56) References Cited

U.S. PATENT DOCUMENTS

| | | |
|---|---|---|
| 6,332,356 B1 | 12/2001 | Hecht et al. |
| 2003/0110854 A1 | 6/2003 | Nakada et al. |
| 2003/0172731 A1 | 9/2003 | Kohno et al. |
| 2003/0182998 A1 | 10/2003 | Goto et al. |
| 2009/0126477 A1 | 5/2009 | Saito et al. |
| 2010/0242589 A1* | 9/2010 | Morino et al. ............ 73/202.5 |

FOREIGN PATENT DOCUMENTS

JP    2002-506528 A    2/2002

OTHER PUBLICATIONS

European Search Report dated Nov. 14, 2001 (Three (3) pages).

* cited by examiner

*Primary Examiner* — Harshad R Patel
(74) *Attorney, Agent, or Firm* — Crowell & Moring LLP

(57) ABSTRACT

A plate-shaped board is arranged so that fluid passages are respectively formed at a sensor-element mounting surface side of the plate-shaped board and at a backside surface side thereof being opposed to the sensor-element mounting surface side, a curved passage portion is provided which is located upstream of the plate-shaped board and changes its direction so as to form a curved line, and the curved passage portion has an outer-side wall surface including a sloping portion that slopes so that, of two edge portions of the outer-side wall surface in a direction perpendicular to board surfaces of the plate-shaped board, the edge portion located on a sidewall surface, facing the sensor-element mounting surface, of the curved passage portion is positioned closer to an inner wall surface of the curved passage portion than the edge portion located on a sidewall surface opposed to the first sidewall surface, along the sidewall surfaces.

9 Claims, 6 Drawing Sheets

FLOW-RATE MEASUREMENT APPARATUS

BACKGROUND OF THE INVENTION

1. Field of the Invention

The present invention relates to a flowmeter, and particularly to a flow-rate measurement apparatus that is favorably used as a part of the intake system of an automotive engine and used to measure the amount of intake air.

2. Description of the Related Art

Various types of flow-rate measurement apparatuses to measure the air-mass flow have been known. A type thereof measures the air-mass flow on the basis of the amount of heat radiated from a heat-generating resistor that is controlled so as to generate heat. Another type thereof measures the air-mass flow on the basis of the temperature change of a thermosensitive resistor placed near a heat-generating resistor that is controlled so as to generate heat.

An air filter is provided in the intake duct of a vehicle to remove dust contained in the air that flows into the intake duct. Thereby, the air cleaned by the air filter is introduced into a sub-passage of the flow-rate measurement apparatus.

However, part of the dust—specifically, that of smaller particles—may pass through the air filter. In addition, if the air filter is improperly fitted in its replacement, such an improperly-fitted air filter allows part of the dust to enter the intake duct.

As the amount of depression of the accelerator pedal increases, the dust having entered the intake duct is accelerated together with the fluid up to several tens of meters per second. The dust thus accelerated may even reach the sub-passage of the flow-rate measurement apparatus.

A mass flow measuring element placed in the sub-passage has a very thin portion. The thin portion may be broken if hit by the dust.

In addition, the dust that has entered the intake duct may adhere to the mass flow measuring element of the flow-rate measurement apparatus. If it occurs, the heat-radiation characteristics of the mass flow measuring element may change, and the change in the heat-radiation characteristics may in turn change the output characteristics.

The following technique has been known which provides a structure of protecting the mass flow measuring element from the dust that has entered the intake duct, and of preventing the time degradation of the mass flow measuring element due to the contamination by the dust. Specifically, at a point located immediately after the inlet, the sub-passage that is formed in a spiral shape is branched into two sub-passages—one located in the inner side (inner-circumferential side) and the other located in the outer side (outer-circumferential side). The inner-side sub-passage is provided with a mass flow measuring element whereas the air flowing through the outer-side sub-passage is let out into the intake duct and thus the dust is discharged (see JP translation of PCT International Application No. 2002-506528).

SUMMARY OF THE INVENTION

The technique described in JP translation of PCT International Application No. 2002-506528 protects the mass flow measuring element in such a way that the sub-passage is formed in a spiral shape, and that the dust is forced to flow into the outer-side sub-passage by the centrifugal separation effect so that the dust is prevented from reaching the mass flow measuring element (sensor element).

It is, however, difficult to force all the particles of the dust to flow into the outer-side sub-passage. Accordingly, it is undeniable that part of the particles of the dust may flow into the inner-side sub-passage and hit the mass flow measuring element.

An object of the present invention is to provide a flow-rate measurement apparatus with a structure with which a mass flow measuring element is less likely to be hit by dust even if the dust enters a sub-passage portion where the mass flow measuring element is placed.

In order to achieve the above object, a flow-rate measurement apparatus according to the present invention includes: a main passage; a sub-passage configured to take part of a fluid flowing through the main passage; and a plate-shaped board having a sensor element mounted on a sensor-element mounting surface side thereof, the sensor element measuring a mass of the fluid is mounted. In the flow-rate measurement apparatus, the plate-shaped board is arranged in a portion of the sub-passage so that fluid passages are respectively formed at the sensor-element mounting surface side and a backside surface side of the plate-shaped board, the backside surface side being the opposite side of the plate-shaped board to the sensor-element mounting surface side, the sub-passage includes a curved passage portion which is located upstream of the plate-shaped board and which changes its direction so as to form a curved line, and the curved passage portion has an outer-side wall surface including a sloping portion that slopes so that, of two edge portions of the outer-side wall surface in a direction perpendicular to board surfaces of the plate-shaped board, the edge portion located on a first sidewall surface of the curved passage portion is positioned closer to an inner wall surface of the curved passage portion than the edge portion located on a second sidewall surface opposed to the first sidewall surface, along the sidewall surfaces, the first sidewall surface facing the sensor-element mounting surface, the second sidewall surface opposed to the first sidewall surface.

Here, the outer-side wall surface may have a linear shape and is formed so as to slope towards the inner-side wall surface. Alternatively, the outer-side wall surface may have a circular-arc shape and is formed so as to slope towards the inner-side wall surface. Still alternatively, the outer-side wall surface may have a polygonal shape and is formed so as to slope towards the inner-side wall surface.

In addition, the curved passage portion may be formed by stacking two members together in the direction perpendicular to the board surfaces of the plate-shaped board, the outer-side wall surface may be formed by outer-side wall surface portions formed respectively in the two members, and the sloping portion may be formed by the outer-side wall surface portion formed in one of the two members which forms the first sidewall surface facing the sensor-element mounting surface in the direction perpendicular to the board surfaces of the plate-shaped board.

Additionally, the sloping portion may be formed also in the outer-side wall surface portion formed in a second one of the two members which forms the second sidewall surface located on the opposite side to the side facing the sensor-element mounting surface.

Moreover, the sub-passage may include: a first sub-passage portion which changes its direction so as to form a curved line; a third sub-passage portion which changes its direction so as to form a curved line, the first and third sub-passage portions provided in a layered manner so as not to intersect each other; and a second sub-passage portion which has a linear shape and in which the plate-shaped board is placed, a curved passage portion which changes its direction so as to form a curved line may be provided in a communicating passage portion between the first and second sub-passage portions, and the sloping portion may be formed in the curved passage portion.

Further, the sub-passage may include: a first sub-passage portion that includes an inlet portion for the fluid; a second sub-passage portion in which the plate-shaped board is provided; and a curved passage portion which changes its direction so as to form a curved line and connects the first sub-passage portion and the second sub-passage portion to each other, and the sloping portion may be formed in the curved passage portion.

Furthermore, the plate-shaped board may be placed in parallel with a direction of the flow of the fluid in the second sub-passage portion, and the fluid passage located on the sensor-element mounting surface side may have a cross-sectional area that is smaller than a cross-sectional area of the fluid passage located on the backside surface side.

According to the flow-rate measurement apparatus of the present invention, by forming the outer-side wall surface of the curved passage portion so as to slope, the dust that has hit the sloping portion is introduced into the passage located at the backside surface side of the plate-shaped board on which a mass flow measuring element is mounted. Accordingly, the dust can be prevented from hitting the mass flow measuring element.

DESCRIPTION OF THE PREFERRED EMBODIMENTS

Figure 1:
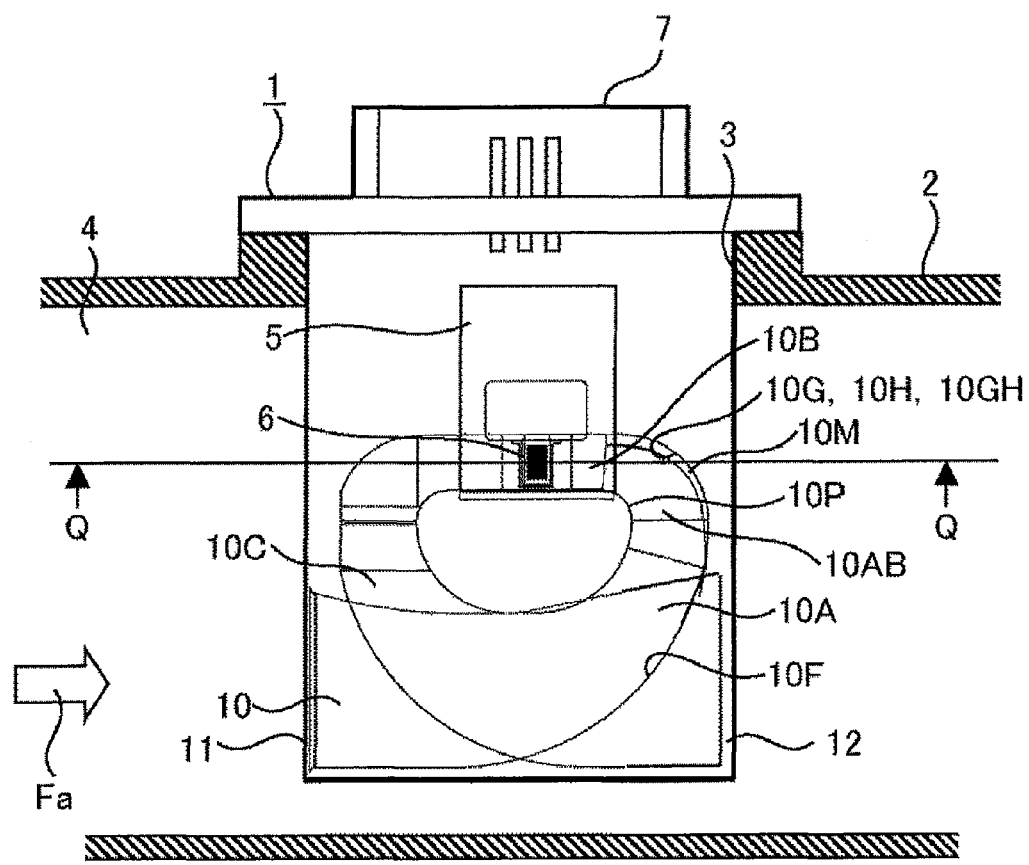
FIG. 1 is a diagram illustrating the configuration of a flow-rate measurement apparatus according to an embodiment of the present invention.

Some embodiments of the present invention will be described below by referring to the drawings.
First Embodiment FIGS. 1 and 2 are diagrams illustrating the configuration of a flow-rate measurement apparatus of the present invention.

Figure 2:
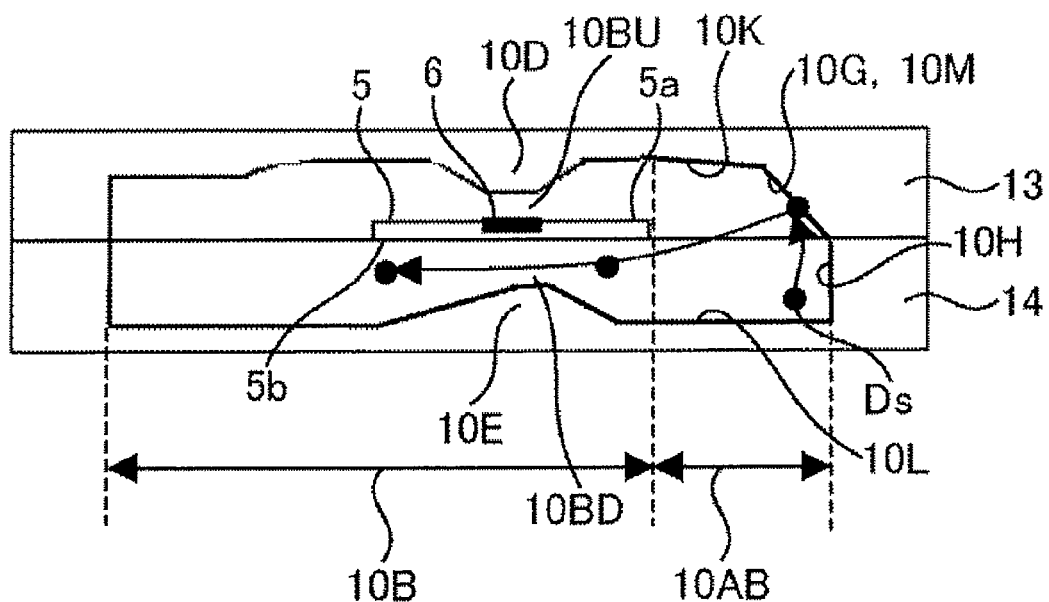
FIG. 2 is a diagram illustrating a section of the flow-rate measurement apparatus according to the embodiment of the present invention taken along the line Q-Q of FIG. 1 and also illustrating how dust is flowing.

FIG. 1 is a diagram illustrating a flow-rate measurement apparatus 1 placed in an intake pipe. FIG. 2 is a sectional view of the flow-rate measurement apparatus taken along the line Q-Q of FIG. 1. In FIGS. 1 and 2, the same portions are denoted by the same reference numerals.

A first embodiment of the present invention will be described below by referring to FIGS. 1 and 2.

The flow-rate measurement apparatus 1 is inserted into an insertion pit 3 formed in an intake pipe 2 of a vehicle. The lower-side portion of the flow-rate measurement apparatus 1 is positioned inside of a main passage 4.

The flow-rate measurement apparatus 1 is assembled to the intake pipe 2 in a cantilevered manner so that its leading-end portion (i.e., the lower-side portion in FIG. 1) can be positioned inside of the main passage 4. A sub-passage 10 is formed in the leading-end portion of the flow-rate measurement apparatus 1. A sensor element 6 that is formed on a silicon substrate mounted on a flat-plate-shaped circuit board 5 is placed inside of the sub-passage 10. The sensor element 6 is used to measure the mass of flow. The circuit board 5 is electrically connected to a connector portion 7 which is equipped with terminals for power supply and for signal outputting.

The sub-passage 10 includes a first sub-passage portion 10A, a second sub-passage portion 10B, and a third sub-passage portion 10C. The first and third sub-passage portions 10A and 10C each change its direction in such a way as to form a curved line. The second sub-passage portion 10B communicatively connects the first and third sub-passage portions 10A and 10C. The first and third sub-passage portions 10A and 10C are formed in a layered manner, and thus do not intersect each other.

FIG. 1 depicts the components located inside of the flow-rate measurement apparatus 1. Each of the components, i.e., the sub-passage 10, the circuit board 5, the sensor element 6, and the connector portion 7 including its terminals and the like are depicted in such a way as to be seen through other components. In particular, all of the first to third sub-passage portions 10A to 10C are shown in FIG. 1. However, since the first sub-passage portion 10A and the third sub-passage portion 10C are arranged in a layered manner in the direction perpendicular to the sheet, it is impossible to see both the first sub-passage portion 10A and the third sub-passage portion 10C in such a manner as shown in FIG. 1, in a cross-sectional view parallel to the sheet.

A first end portion (outer end) of the first sub-passage portion 10A serves as an inlet 11 for the flow of the fluid whereas a second end portion (inner end) of the first sub-passage portion 10A is communicatively connected to a first end of the second sub-passage portion 10B. A second end of the second sub-passage portion 10B is communicatively connected to a first end portion (inner end) of the third sub-passage portion 10C whereas a second end portion (outer end) of the third sub-passage portion 10C serves as an outlet 12 for the flow of the fluid. Each of the inlet 11 and the outlet 12 has an opening formed in a plane orthogonal to the direction in which the fluid flows inside of the main passage 4. Of the two end portions that each of the first and third sub-passage portions 10A and 10C has, the "outer end" refers to the end located at an end of the sub-passage 10 whereas the "inner end" refers to the end located at a position in the course of the sub-passage 10.

An air filter (not illustrated) is arranged in the main passage 4 in a position upstream of the flow-rate measurement apparatus 1. The air filter is designed to remove the dust contained in the fluid Fa. However, the air filter cannot remove all the dust contained in the fluid.

The flow-rate measurement apparatus 1 forces the dust to flow in the outer-circumferential route of the passage by using the centrifugal separation function that a curved-line portion (curved portion) 10F of the first sub-passage portion 10A shown in FIG. 1 has, and thereby make part of the dust that has moved into the second sub-passage portion 10B less likely to hit the sensor element 6. Nevertheless, the effect of reducing the occurrence of the hitting is not always sufficient.

To cope with this, the first embodiment slopes an outer-side wall surface (outer-circumferential wall surface) 10G of a communicating passage portion 10AB, which communicates between the first and second sub-passage portions 10A and 10B, and thus forms a sloping portion 10M. The sloping portion 10M is formed in order to prevent some part of the dust that has moved into the first sub-passage portion 10A and reached even to the communicating passage portion 10AB from hitting the sensor element 6 as much as possible.

The configuration of and the advantageous effects of the sloping portion 10M will be described next.

FIG. 2 is a sectional diagram taken along the line Q-Q of FIG. 1. Here, the portions that are the same as those in FIG. 1 are denoted by the same reference numerals.

In FIG. 2, the communicating passage portion 10AB and the second sub-passage portion 10B are formed in a space where a housing member 13 and a base member 14 are superimposed on each other. The circuit board 5 placed on the base member 14 is arranged so that the sensor element 6 may face the housing member 13 in the second sub-passage portion 10B. Moreover, in the second sub-passage portion 10B, a fluid passage 10BU is formed on the surface side on which the sensor element 6 is mounted (hereinafter referred to as a sensor-element mounting surface 5a), and a fluid passage 10BD is formed on the opposite side (hereinafter referred to as a backside surface 5b).

The sloping portion 10M is formed by sloping the outer-side wall surface (outer-circumferential wall surface) 10G, which is a portion of the communicating passage portion 10AB on the housing member 13 side. The outer-side wall surface (outer-circumferential wall surface) 10G slopes in such a direction that, of the two edge portions of the outer-side wall surface (outer-circumferential wall surface) 10G in a direction perpendicular to the board surfaces of the circuit board 5 (height direction), the edge portion located on the side of a sidewall surface 10K of the communicating passage portion 10AB, the sidewall surface 10K facing the sensor-element mounting surface 5a of the circuit board 5, is positioned inward of the edge portion located on the side of a sidewall surface 10L opposed to the sidewall surface 10K (i.e., a position closer to an inner-side wall surface 10P) along the sidewall surface 10K. In this case, the outer-side wall surface (outer-circumferential wall surface) 10G slopes so that, of the two end portions of the outer-side wall surface (outer-circumferential wall surface) 10G in the height direction, the edge portion located on the sidewall surface 10K side is positioned inward of an outer-side wall surface (outer-circumferential wall surface) 10H of the base member 14 along the sidewall surface 10K. To put it differently, the outer-side wall surface (outer-circumferential wall surface) 10G of this first embodiment slopes in the following way. Of the two end portions of the outer-side wall surface (outer-circumferential wall surface) 10G in the height direction, the edge portion located on the sidewall surface 10K side slopes with respect to the edge portion located on the side of a sidewall surface 10L opposed to the sidewall surface 10K so as to narrow the cross-sectional area of the passage (i.e., the cross-sectional area that is perpendicular to the direction of the fluid flow) of the communicating passage portion 10AB.

Note that the inner-side wall surface (inner-circumferential wall surface) 10P includes an inner-side wall surface (inner-circumferential wall surface) portion on the housing member 13 side and an inner-side wall surface (inner-circumferential wall surface) portion of the base member 14 side.

Part of the fluid Fa flowing in the main passage 4 flows into the first sub-passage portion 10A. Then, in the communicating passage portion 10AB, the flow of the fluid Fa is branched into two flows, i.e., one flowing through the upside passage 10BU formed between the housing member 13 and the surface of the sensor element 6 provided on the circuit board 5 and the other flowing through the downside passage 10BD formed between the base member 14 and the backside surface 5b of the circuit board 5. The fluid flowing on the surface of the sensor element 6 is the target of the flow-mass measurement.

Most of the dust Ds flows through the downside passage 10BD, and thus never hits the sensor element 6. Nevertheless, the fluid which contains the dust Ds and which flows in the first sub-passage portion 10A may still try to move into the upside passage 10BU. How the dust Ds flies in such a case will be described next by referring to FIG. 2.

The dust Ds that tries to move into the upside passage 10BU hits and bounces off the sloping portion 10M, whereby its kinetic energy is reduced. The dust Ds of the reduced kinetic energy will be transported by the fluid that flows on the backside surface 5b of the circuit board 5.

As FIG. 1 shows, the sloping portion 10M, which is a part of the housing member 13, of the communicating passage portion 10AB is formed so as to slope towards the passage continuously until reaching a position near the circuit board 5. The sensor element 6 is located at a position shifted, from the dividing plane between the housing member 13 and the base member 14, towards the housing member 13.

Accordingly, the fluid flowing through the upside passage 10BU located above the sensor element 6 flows along the sloping portion 10M. This makes the dust Ds contained in that fluid hit and bounce off the sloping portion 10M at whatever position the dust Ds flows within the communicating passage portion 10AB, and the bounced-off dust Ds is transported by the fluid flowing through the downside passage 10BD located below the circuit board 5.

Figure 3:
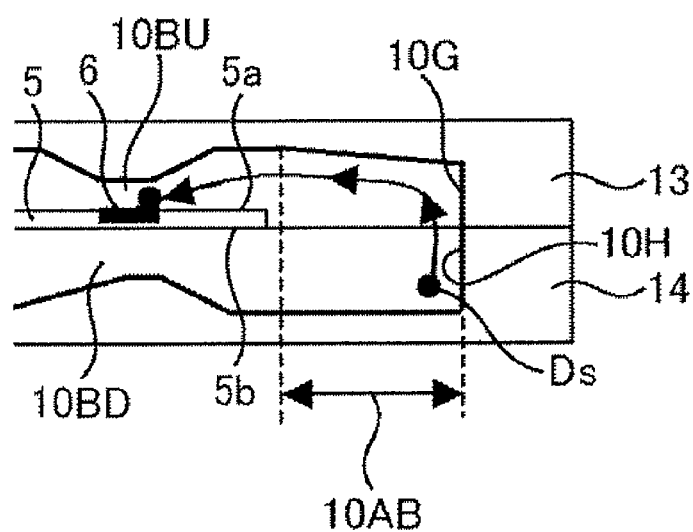
FIG. 3 is a diagram illustrating how dust is flowing and provided for the purpose of being compared with the case of the flow-rate measurement apparatus according to the embodiment of the present invention.

FIG. 3 shows the trajectory pattern of the dust Ds of a case where the outer-side wall surface (outer-circumferential wall surface) 10G of the communicating passage portion 10AB does not slope. In this case, the dust Ds is transported by the fluid flowing through the upside passage 10BU located above the sensor element 6. Hence, more particles of the dust Ds hit the sensor element 6, so that the sensor element 6 cannot be sufficiently protected against the dust Ds.

According to the first embodiment, the fluid that flows on the backside surface 5b of the circuit board 5 contains greater part of the dust Ds while the fluid flowing on the sensor-element mounting surface 5a of the circuit board 5 contains smaller part of dust Ds. This makes the dust Ds less likely to hit the sensor element 6.

Consequently, the reliability of the flow-rate measurement apparatus 1 can be enhanced.

When viewed in the section shown in FIG. 2, the outer-side wall surface 10G of the communicating passage portion 10AB has a linear shape and slopes towards the passage. However, the outer-side wall surface 10G is not limited to a linear-shaped slope as long as the outer-side wall surface 10G has a shape that can bounce the dust Ds back.

Figure 4:
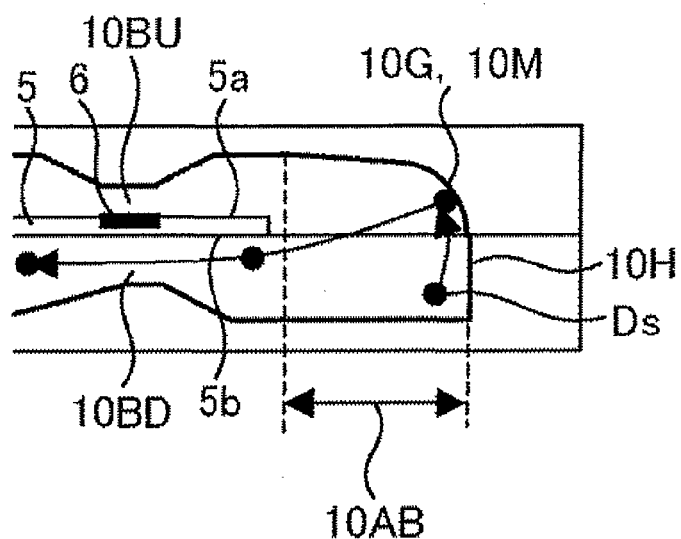
FIG. 4 is a diagram illustrating how dust is flowing in a case of a modified shape of a sloping portion from that of FIG. 2.
Figure 5:
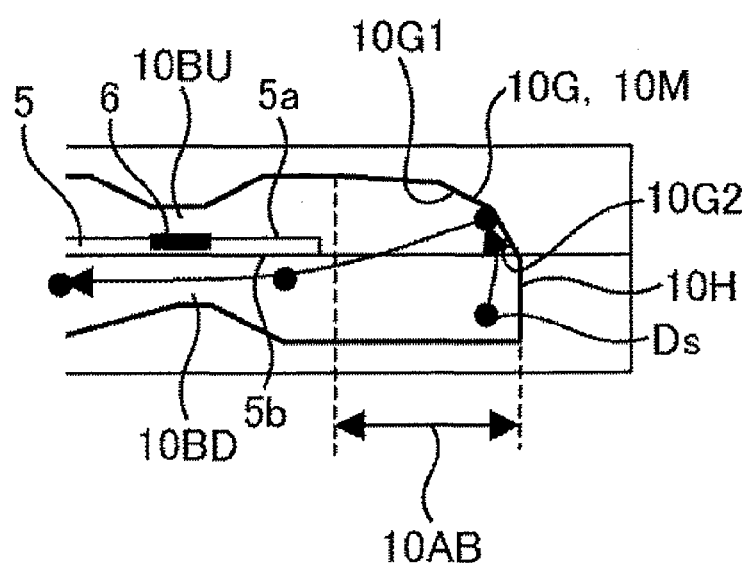
FIG. 5 is a diagram illustrating how dust is flowing in a case of another modified shape of the sloping portion from that of FIG. 2.

FIG. 4 shows a case where the outer-side wall surface 10G has a circular-arc shape when viewed in the section shown in FIG. 4. FIG. 5 shows a case where the outer-side wall surface 10G is formed by forming continuously two linear portions 10G1 and 10G2 when viewed in the section shown in FIG. 5. In both of these cases, when the dust Ds hits the outer-side wall surface 10G, the dust Ds bounces off the outer-side wall surface 10G and is transported by the fluid flowing through the passage facing the backside surface 5b of the circuit board 5. Accordingly, the same effect as that obtained in the case of FIG. 2 can be obtained.

Figure 6:
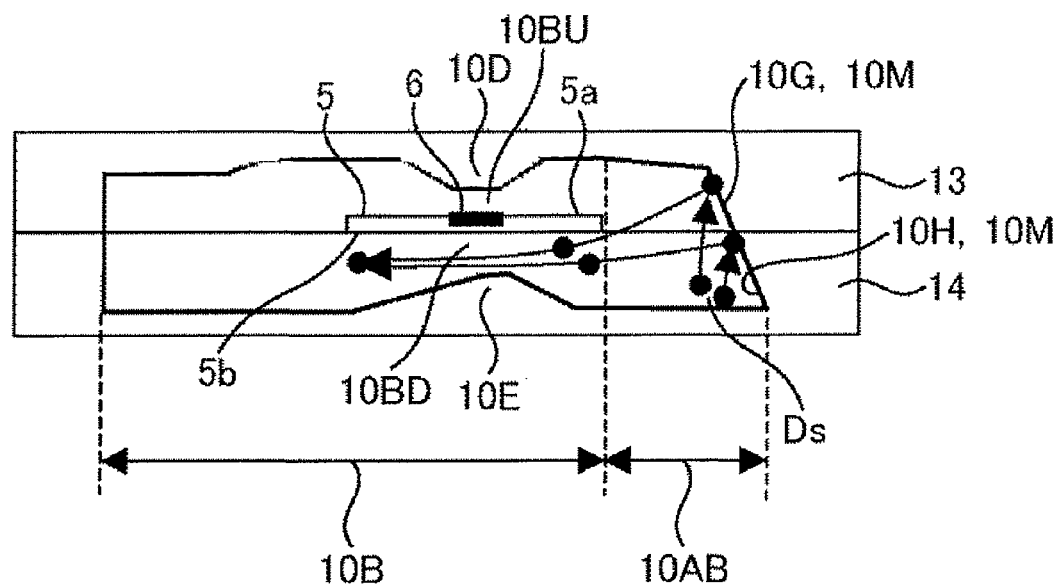
FIG. 6 is a diagram illustrating how dust is flowing in a case of another modified shape of the sloping portion from that of FIG. 2.

The cases shown in FIGS. 2, 4, and 5 of the first embodiment cause the communicating passage portion 10AB of the housing member 13 to slope at the sloping portion 10M. It is, however, possible to form a sloping portion continuously from the outer-side wall surface 10H of the base member 14, as shown in FIG. 6.

In this case, the dust Ds that hits the sloping portion 10M and the outer-side wall surface 10H bounces off these walls 10G and 10H, and is then transported by the fluid flowing through the downside passage 10BD located below the circuit board 5. Accordingly, the same effect as that obtained in the first embodiment can be obtained.

In addition, to obtain the same advantageous effect, the sloping portion 10M can start from any position, in the direction perpendicular to the board surfaces of the circuit board 5 (i.e., in the height direction), within the outer-side wall surface 10G of the housing member 13 and the outer-side wall surface 10H of the base member 14.

In addition, a more effective way to cause the dust Ds to be transported through the downside passage 10BD can be provided by combining the sloping portion 10M with the following structure. Specifically, for speeding up the fluid flowing through the downside passage 10BD, protruding portions 10D and 10E for adjusting the speed of the flowing fluid are formed respectively above and below the sensor element 6 so that the positions thereof may be optimized with respect to the circuit board 5.

The first embodiment having been described thus far has the following configuration. The communicating passage portion 10AB of the sub-passage 10 that is formed by the housing member 13 and the base member 14 is provided with the sloping portion 10M. The sloping portion 10M slopes in such a direction that, of the edge portions of the outer-side wall surfaces (outer-circumferential wall surfaces) 10G and 10H in the direction perpendicular to the board surfaces of the circuit board 5 (height direction), the edge portion located on the side of the sidewall surface 10K of the communicating passage portion 10AB, the sidewall surface 10K facing the sensor-element mounting surface 5a of the circuit board 5, is positioned inward of the edge portion located on the side of the sidewall surface 10L opposed to the sidewall surface 10K (i.e., a position closer to the inner-side wall surface 10P) along the sidewall surface 10K.

Figure 7:
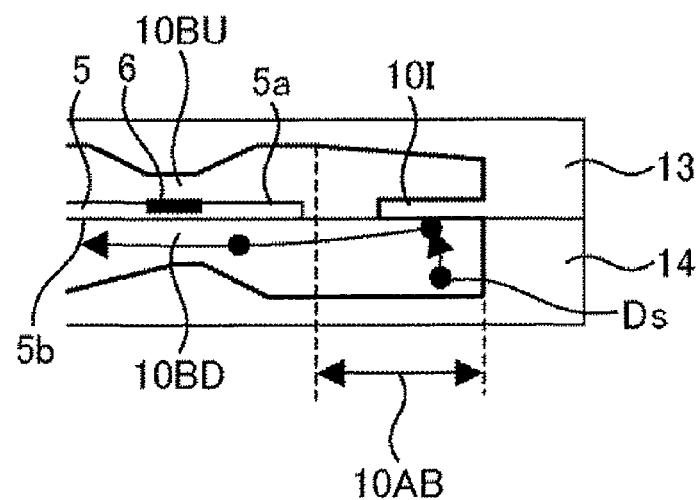
FIG. 7 is a diagram illustrating how dust is flowing in a case of replacing the sloping portion of FIG. 2 with a partition wall.

In the first embodiment described above, the outer-side wall surface 10G of the housing member 13 and the outer-side wall surface 10H of base member 14 are each formed to have a slope. FIG. 7 shows another way of making the dust Ds be transported through the passage located at the opposite side of the circuit board 5 to the sensor element 6.

In FIG. 7, a partition wall 10I is formed so as to extend from the housing member 13. The partition wall 10I sub-divides the communicating passage portion 10AB into upper and lower sections.

While the fluid which contains the dust Ds and which has flowed into the first sub-passage portion 10A flows through the communicating passage portion 10AB, the dust Ds hits and bounces off the partition wall 10I, and is transported through the passage located at the opposite side of the circuit board 5 to the sensor element 6. Hence, the same effect as that obtained by the first embodiment can be obtained.

In all the examples of the first embodiment which are shown in FIGS. 2 to 7, the circuit board 5 is provided so as to be aligned with the dividing plane between the housing member 13 and the base member 14. The circuit board 5, however, does not necessarily have to be aligned with the dividing plane. The circuit board 5 may be shifted either towards the housing member 13 or towards the base member 14 as long as the above-described effect can be obtained.

Second Embodiment

The thermal-type flow-rate measurement apparatus 1 of the first embodiment shown in FIG. 1 has the following configuration. The spiral-shaped sub-passage 10 that goes round by an angle larger than 360° is formed by the first sub-passage portion 10A, the second sub-passage portion 10B, and the third sub-passage portion 10C. In addition, each of the inlet 11 of the first sub-passage portion 10A and the outlet 12 of the third sub-passage portion 10C has an opening formed in the plane orthogonal to the flow of the fluid through the main passage 5.

Figure 8:
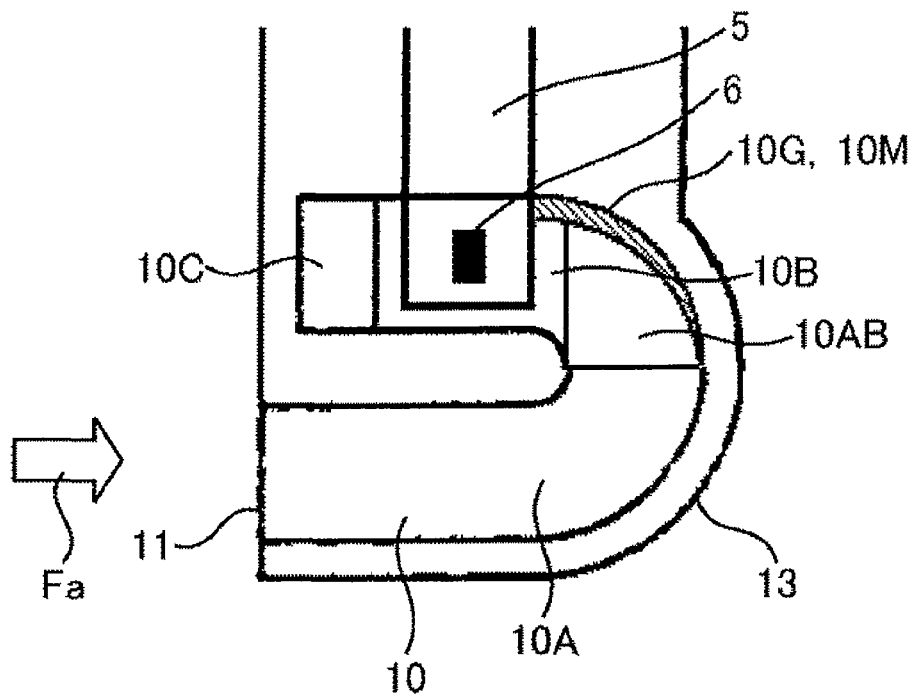
FIG. 8 is a diagram illustrating the configuration of a part of a flow-rate measurement apparatus according to another embodiment of the present invention.
Figure 9:
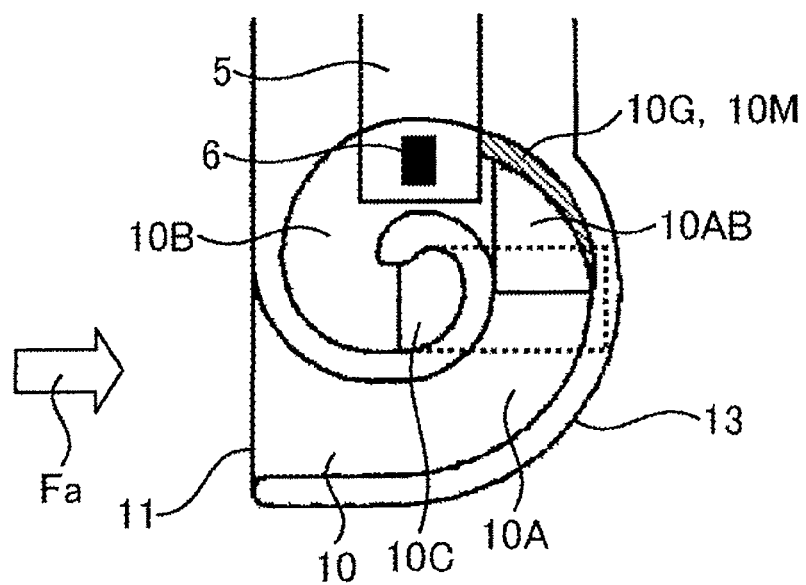
FIG. 9 is a diagram illustrating a case with a modified sub-passage from the one of FIG. 8.

The sub-passage 10 of the thermal-type flow-rate measurement apparatus 1 may be formed in a variety of forms appropriate for their respective uses. FIGS. 8 and 9 show other forms of the sub-passage 10 according to a second embodiment of the present invention. The portions that have the same functions as those in the first embodiment are denoted respectively by the reference numerals used in the first embodiment.

Each of FIGS. 8 and 9 is a diagram illustrating a way of placing the circuit board 5, the sensor element 6, and a portion of the sub-passage 10 formed in a member that corresponds to the housing member 13 of the first embodiment. A thermal-type flow-rate measurement apparatus in FIGS. 8 and 9 forms the sub-passage 10 by stacking, from below of each of FIGS. 8 and 9, a member (not shown) that corresponds to the base member 14 of the first embodiment.

The thermal-type flow-rate measurement apparatus 1 shown in FIG. 8 has the following features. The inlet 11 of the first sub-passage portion 10A has an opening formed in the plane orthogonal to the flow of the fluid through the main passage 4. The outlet 12 of the third sub-passage portion 10C has an opening formed in a plane that is parallel with the flow of the fluid through the main passage 4. The sub-passage thus formed from the inlet 11 to the outlet 12 changes its direction so as to form a curved line by an angle smaller than 360°.

Part of the fluid Fa that flows through the main passage 4 flows, through the inlet 11 formed in the plane orthogonal to the direction of flow of the fluid Fa, through: the first sub-passage portion 10A; the communicating passage portion 10AB which communicatively connects the first sub-passage portion 10A and the second sub-passage portion 10B, where the sensor element 6 is provided; the second sub-passage portion 10B; and the third sub-passage portion 10C. After that, the part of the fluid Fa is discharged through the outlet 12 formed so as to be parallel with the direction of the fluid flowing through the main passage 4.

Each of the first sub-passage portion 10A and the second sub-passage portion 10B, where sensor element 6 is provided, is formed in a linear shape. The communicating passage portion 10AB communicatively connects the first sub-passage portion 10A and the second sub-passage portion 10B to each other. The outer-side wall surface (outer-circumferential wall surface) 10G of the communicating passage portion 10AB is formed so as to slope towards the communicating passage portion 10AB. Thus formed is the sloping portion 10M.

The circuit board 5 is placed in the second sub-passage portion 10B at the same position in the height direction as that of the circuit board 5 in the first embodiment. In addition, the sloping direction of and the form of the sloping portion 10M are the same as those in the first embodiment.

If the fluid flowing through the communicating passage portion 10AB contains dust, part of the dust hits and bounces off the sloping portion 10M of the outer-side wall surface 10G, and is transported by the fluid flowing below the sensor element 6. Hence, the amount of dust that hits the sensor element 6 can be reduced. Accordingly, the same effect as that obtained in the first embodiment can be obtained.

The sub-passage 10 shown in FIG. 9 has the following features. The inlet 11 of the first sub-passage portion 10A has an opening formed in the plane that is orthogonal to the flow of the fluid through the main passage 4. The outlet 12 of the third sub-passage portion 10C has an opening formed in a plane that is parallel with the flow of the fluid through the main passage 4. The sub-passage 10 thus formed from the inlet 11 to the outlet 12 changes its direction so as to form a curved line by an angle equal to or larger than 360°. In this example, the second sub-passage portion 10B, where the sensor element 6 is provided, changes its direction so as to form a curved line. The curved shape of the second sub-passage portion 10B differs from the linear shape of the second sub-passage portion 10B of the first embodiment (FIG. 1). In addition, both the first sub-passage portion 10A and the second sub-passage portion 10B of the sub-passage 10, which changes its direction so as to form a curved line by an angle equal to or larger than 360°, are formed on a single plane.

Part of the fluid Fa that flows through the main passage 4 flows, through the inlet 11 formed in the plane orthogonal to the direction of flow of the fluid Fa, through: the first sub-passage portion 10A; the communicating passage portion 10AB which communicatively connects the first sub-passage portion 10A to the second sub-passage portion 10B where the sensor element 6 is provided; the second sub-passage portion 10B; the third sub-passage portion 10C. After that, the part of the fluid Fa is discharged through the outlet 12 formed so as to be parallel with the direction of the fluid flowing through the main passage 4.

The outer-side wall surface 10G of the communicating passage portion 10AB slopes towards the passage to form the sloping portion 10M. The advantageous effect obtainable by this sloping is the same as that obtained in the first embodiment.

The circuit board 5 is placed in the second sub-passage portion 10B at the same position in the height direction as that in the first embodiment. In addition, the sloping direction of and the form of the sloping portion 10M are the same as those in the first embodiment.

The foregoing description is based on a case where the outlet 12 of the third sub-passage portion 10C has an opening formed in a plane that is parallel with the direction of the flow of the fluid through the main passage 4. Alternatively, the outlet 12 may have an opening formed, on the backside surface of the first sub-passage portion 10A as shown by the dashed line, in a plane orthogonal to the direction of the flow of the fluid. A thermal-type flow-rate measurement apparatus 1 with such configuration can have the same advantageous effect.

In addition, in the case shown in FIG. 9, the second sub-passage portion 10B has a curved shape and is provided with the sensor element 6. Alternatively, the second sub-passage portion 10B may have a linear shape and be provided with the sensor element 6.

In addition, protruding portions 10D and 10E shown in the first embodiment may be formed in the housing member 13 and in the base member (not illustrated) to make the speed of the flow above the sensor element 6 slower than the speed of the flow below the sensor element 6.

Third Embodiment

Figure 10:
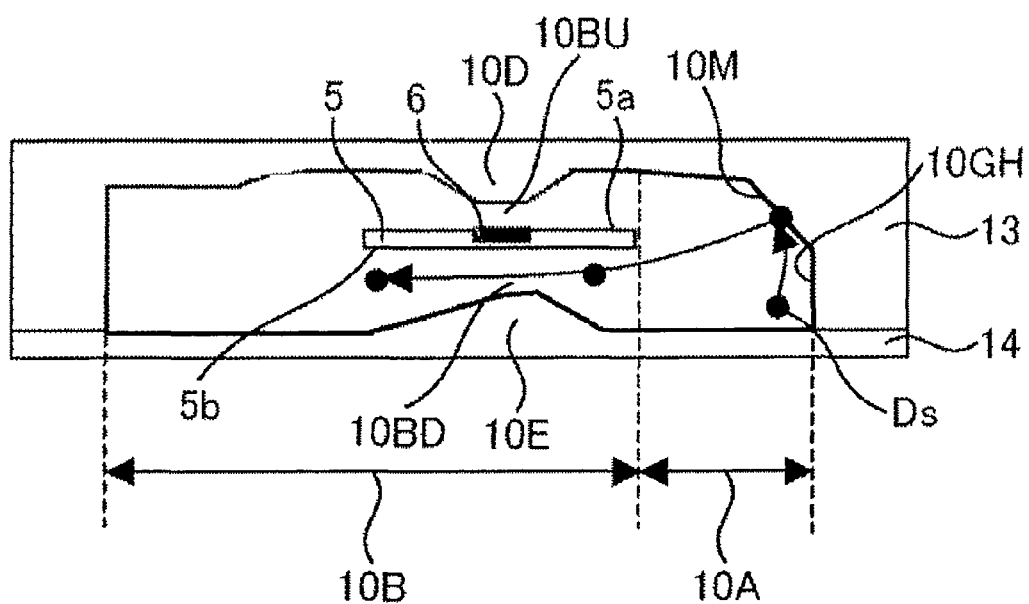
FIG. 10 is a diagram illustrating how dust is flowing in a flow-rate measurement apparatus according to still another embodiment of the present invention.

FIG. 10 is a diagram showing still another embodiment. The portions that are identical to those shown in FIG. 2 are denoted by the same reference numerals.

The thermal-type flow-rate measurement apparatus 1 shown in each of the first and second embodiments has the following features. Each of the housing member 13 and the base member 14 includes a part of the outer-side wall surface (10G or 10H) of the sub-passage 10, a part of the inner-side wall surface 10P of the sub-passage 10, and a sidewall surface (10K or 10L) that connects the outer-side wall surface and the inner-side wall surface to each other. The sub-passage 10 of the final shape is formed by stacking the two members 13 and 14 together.

In the example shown in FIG. 10, an entire outer-side wall surface 10GH of the sub-passage 10 and the entire inner-side wall surface 10P are formed in the housing member 13. The base member 14 has a plate shape with one side-wall-surface protruding portion 10E formed therein. The housing member 13 thus formed and the base member 14 thus formed are stacked together.

The sloping of the outer-side wall surface 10G of the communicating passage portion 10AB of the housing member 13 towards the passage may start from any position or the entire outer-side wall surface 10G may slope towards the passage. The advantageous effect obtainable in the first embodiment can be obtained in this way.

Note that it is possible to form the sub-passage 10 in the unillustrated base member 14 and to form the housing member 13 in a plate shape with the protruding portion 10D formed therein.

Note that the term "dust" used in the description of the first to third embodiments is a generic term that refers to particulate materials of any kinds. The term "dust" in the description given above should not be understood by its strict sense.

Explanation of Reference Numerals

1 . . . flow-rate measurement apparatus, 5 . . . circuit board, 6 . . . sensor element, 10A . . . first sub-passage portion, 10B . . . second sub-passage portion, 10C . . . third sub-passage portion, 10AB . . . communicating passage portion, 10D . . . protruding portion formed at sensor-element side within second sub-passage portion, 10E . . . protruding portion formed at opposite side to sensor element within second sub-passage portion, 10G, 10H, 10GH . . . outer-side wall surface of communicating passage portion, 10P . . . inner-side wall surface of communicating passage portion, 13 . . . housing member, 14 . . . base member

What is claimed is:

1. A flow-rate measurement apparatus comprising:
a main passage;
a sub-passage configured to take part of a fluid flowing through the main passage; and
a plate-shaped board having a sensor element for measuring a mass of the fluid, which is mounted on a sensor-element mounting surface side thereof,
wherein the plate-shaped board is arranged in a portion of the sub-passage so that fluid passages are respectively formed at the sensor-element mounting surface side and a backside surface side of the plate-shaped board, the backside surface side being the opposite side of the plate-shaped board to the sensor-element mounting surface side, the sub-passage includes a curved passage portion which is located upstream of the plate-shaped board and which changes its direction so as to form a curved line, and the curved passage portion has an outer-side wall surface including a sloping portion that slopes so that, of two edge portions of the outer-side wall surface in a direction perpendicular to board surfaces of the plate-shaped board, the edge portion located on a first sidewall surface of the curved passage portion is positioned closer to an inner wall surface of the curved passage portion than the edge portion located on a second sidewall surface opposed to the first sidewall surface, along the sidewall surfaces, the first sidewall surface facing the sensor-element mounting surface, the second sidewall surface opposed to the first sidewall surface.

2. The flow-rate measurement apparatus according to claim 1, wherein the outer-side wall surface has a linear shape and is formed so as to slope towards the inner-side wall surface.

3. The flow-rate measurement apparatus according to claim 1, wherein the outer-side wall surface has a circular-arc shape and is formed so as to slope towards the inner-side wall surface.

4. The flow-rate measurement apparatus according to claim 1, wherein the outer-side wall surface has a polygonal shape and is formed so as to slope towards the inner-side wall surface.

5. The flow-rate measurement apparatus according to claim 1,
wherein the curved passage portion is formed by stacking two members together in the direction perpendicular to the board surfaces of the plate-shaped board,
the outer-side wall surface is formed by outer-side wall surface portions formed respectively in the two members, and
the sloping portion is formed by the outer-side wall surface portion formed in one of the two members which forms the first sidewall surface facing the sensor-element mounting surface in the direction perpendicular to the board surfaces of the plate-shaped board.

6. The flow-rate measurement apparatus according to claim 5, wherein the sloping portion is formed also in the outer-side wall surface portion formed in a second one of the two members which forms the second sidewall surface located on the opposite side to the side facing the sensor-element mounting surface.

7. The flow-rate measurement apparatus according to claim 1,
wherein the sub-passage includes:
a first sub-passage portion which changes its direction so as to form a curved line;
a third sub-passage portion which changes its direction so as to form a curved line, the first and third sub-passage portions provided in a layered manner so as not to intersect each other; and
a second sub-passage portion which has a linear shape and in which the plate-shaped board is placed,
a curved passage portion which changes its direction so as to form a curved line is provided in a communicating passage portion between the first and second sub-passage portions, and
the sloping portion is formed in the curved passage portion.

8. The flow-rate measurement apparatus according to claim 7,
wherein the plate-shaped board is placed in parallel with a direction of the flow of the fluid in the second sub-passage portion, and
the fluid passage located on the sensor-element mounting surface side has a cross-sectional area that is smaller than a cross-sectional area of the fluid passage located on the backside surface side.

9. The flow-rate measurement apparatus according to claim 1,
wherein the sub-passage includes:
a first sub-passage portion that includes an inlet portion for the fluid;
a second sub-passage portion in which the plate-shaped board is provided; and
a curved passage portion which changes its direction so as to form a curved line and connects the first sub-passage portion and the second sub-passage portion to each other, and
the sloping portion is formed in the curved passage portion.

* * * * *